United States Patent Office 3,397,460
Patented Aug. 20, 1968

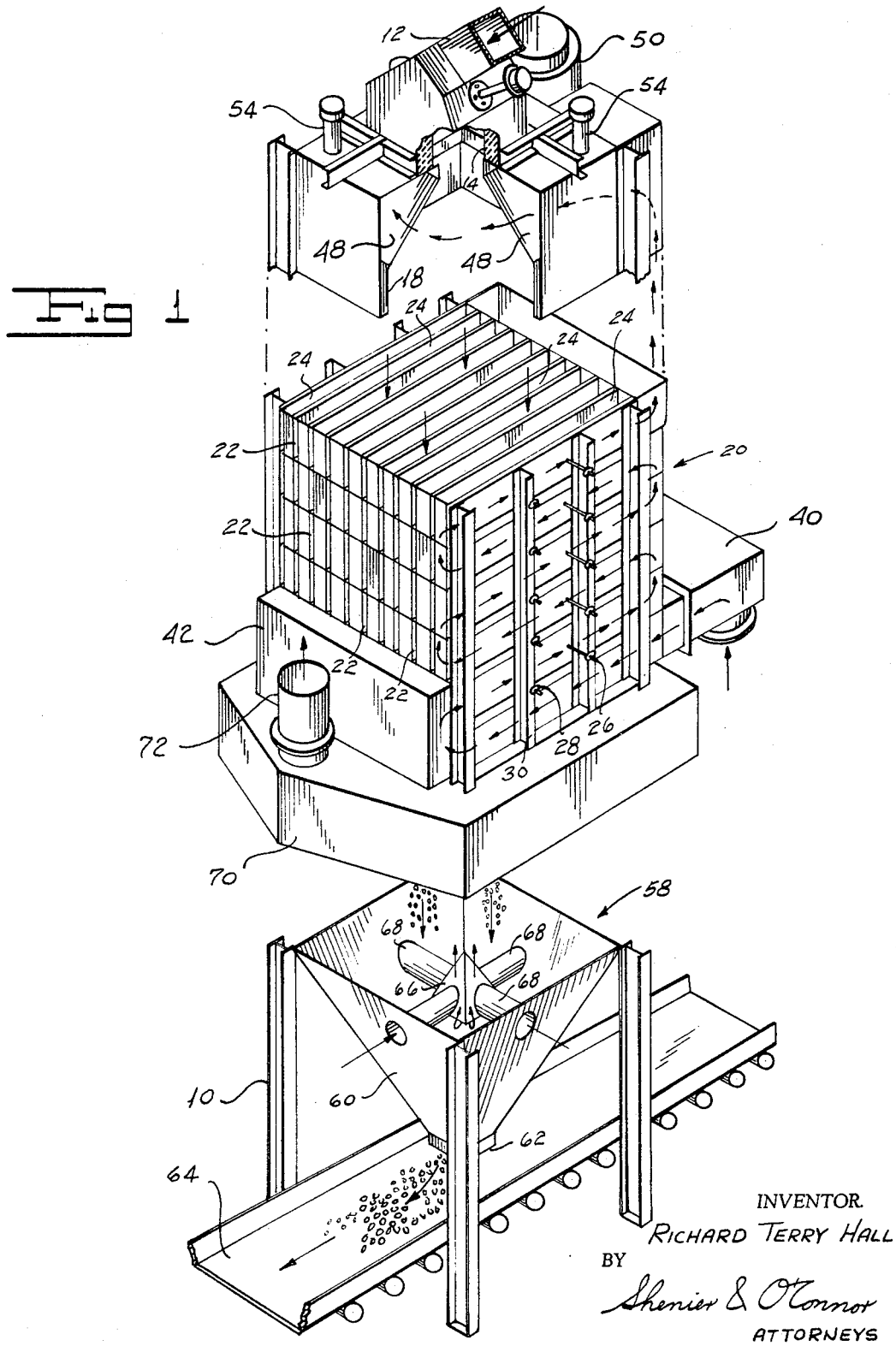

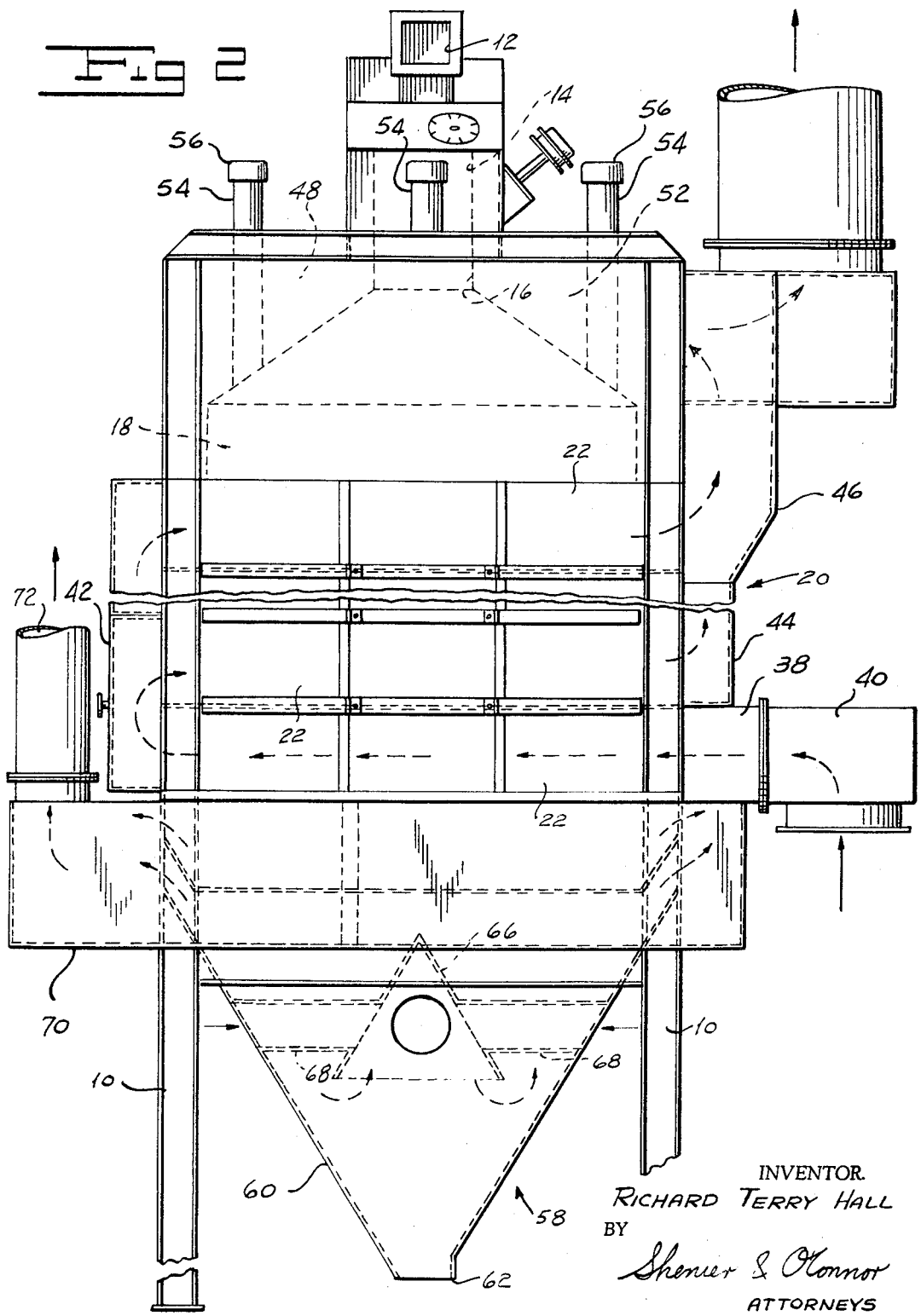

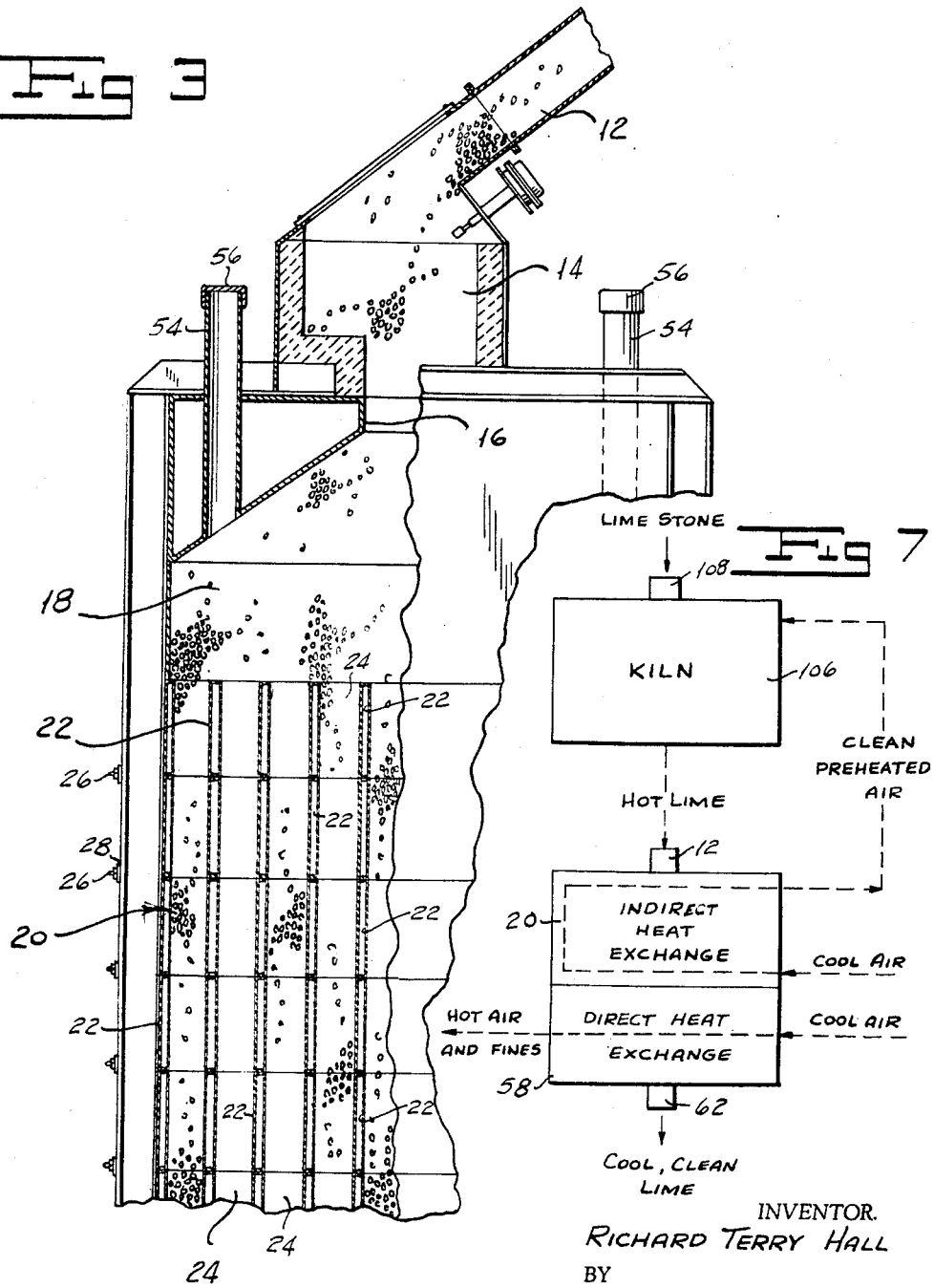

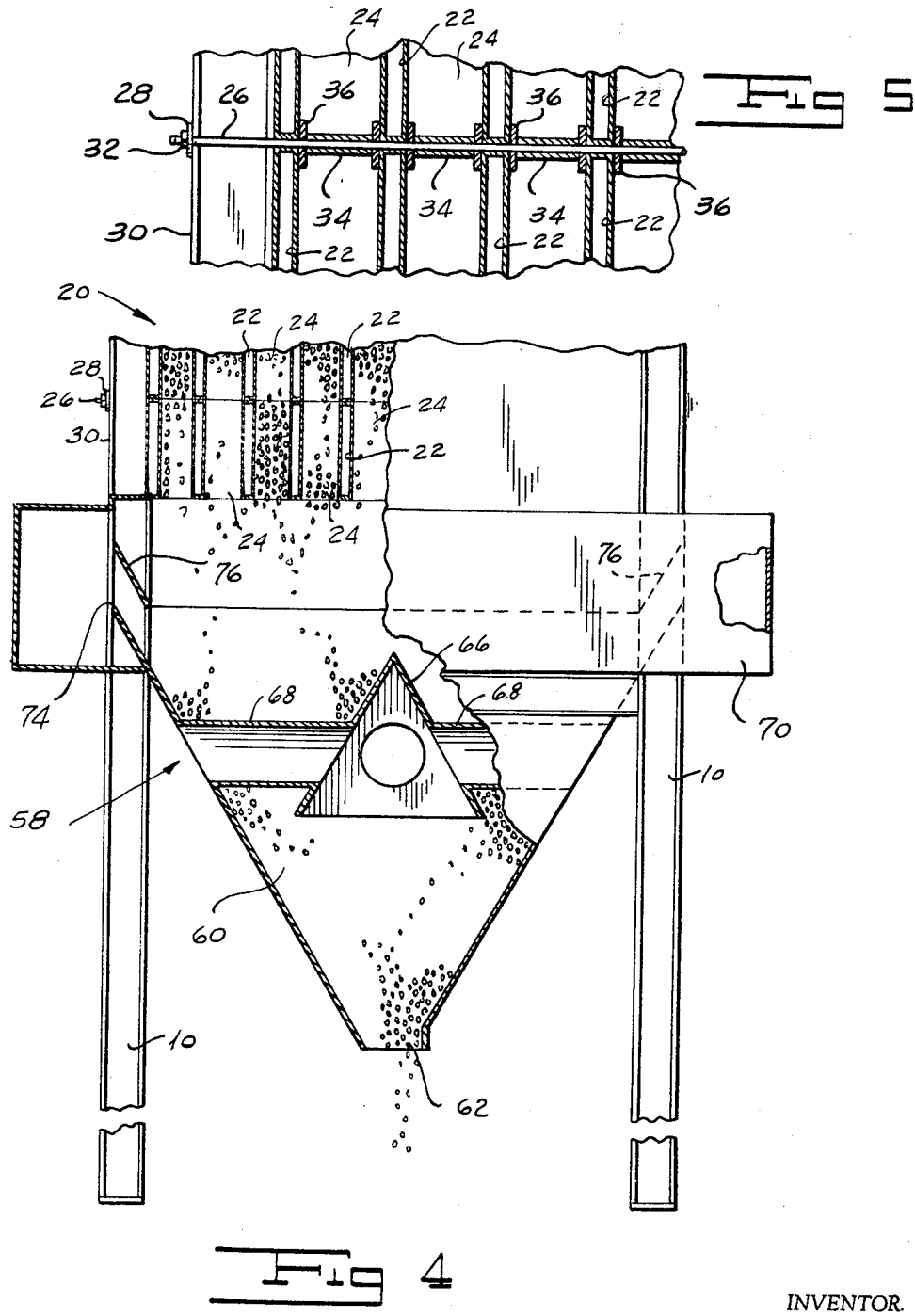

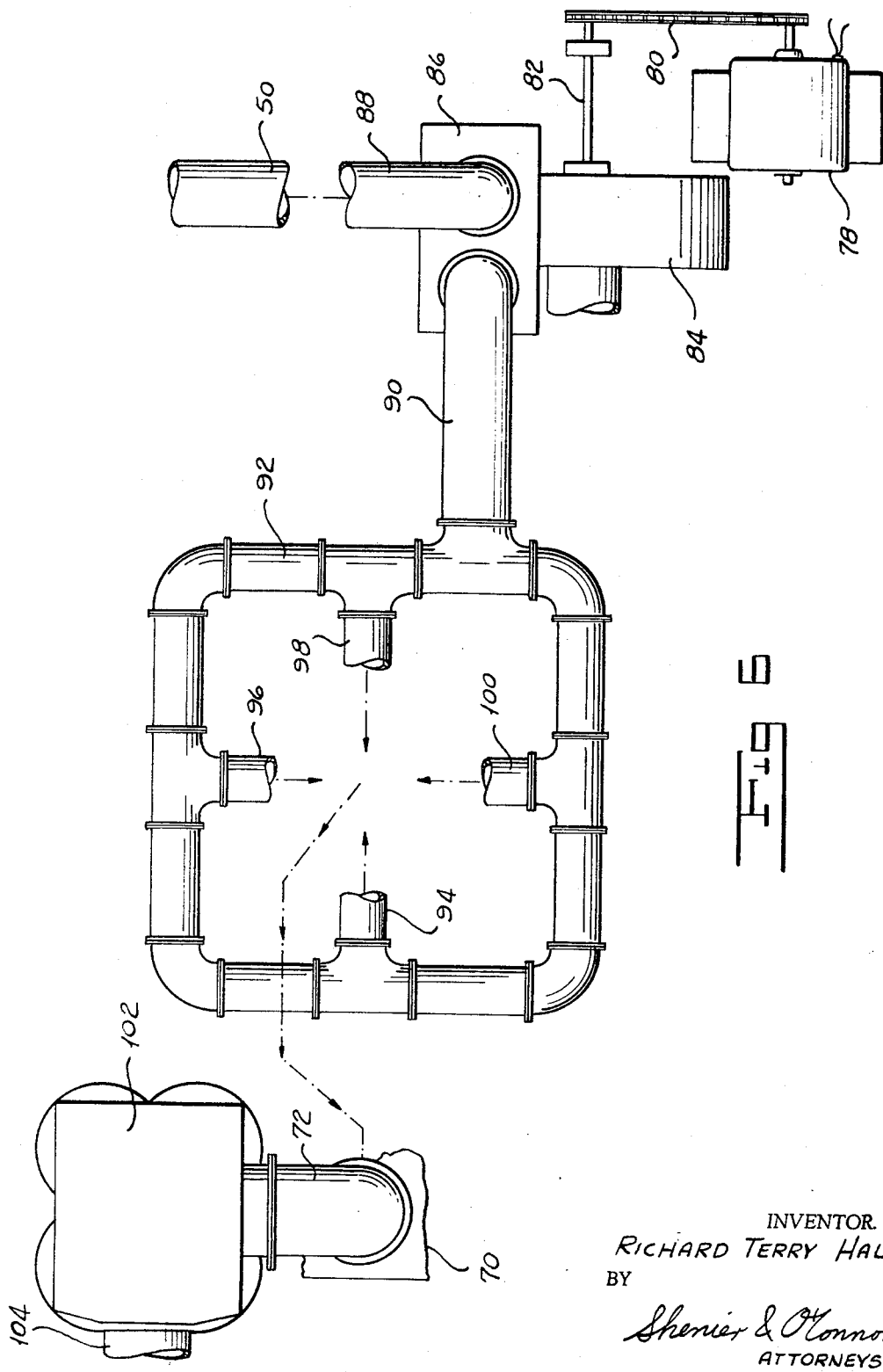

3,397,460
HEAT EXCHANGE SYSTEM FOR CALCINER
Richard Terry Hall, Toronto, Ontario, Canada, assignor to International Processes Limited
Filed Oct. 12, 1965, Ser. No. 495,132
16 Claims. (Cl. 34—20)

ABSTRACT OF THE DISCLOSURE

A heat exchange system for a calciner in which hot lime to be cooled first moves by gravity through passages formed by aligned ducts of tiers of ducts of an indirect heat exchanger having means for passing cooling air through the ducts to provide clean exhaust air and then the lime passes through a direct heat exchanger including an inverted pyramidal chamber and a central erect pyramidal baffle with cooling air being supplied through a conduit passing through the chamber wall and through the baffle to the interior thereof. The clean exhaust air discharged from the indirect heat exchanger is conducted to a kiln to supply air for preheating the charge fed thereto while the exhaust air discharged from the direct heat exchanger passes to a dust collector.

---

My invention relates to a heat exchange system for a calciner and more particularly to a system for cooling hot lime while at the same time providing preheated combustion air for the kiln and removing fines from the lime.

In the prior art of calcining or of producing lime from limestone, lime comes from the kiln at a temperature of about 2000° F. In order for the material to be handled in an efficient manner, it must be cooled more rapidly than it would be if it were merely allowed to stand. Further, in calciners of the prior art for most efficient operation, combustion air is preheated before being supplied to the kiln.

It has been suggested in the prior art that the lime may be cooled by direct heat exchange of the lime or the like with air blown through the material as it comes from the kiln. Moreover, the air after being heated by this exchange might be used as secondary combustion air. Not only is this cooling process relatively inefficient but a large amount of fines would be entrained in the secondary combustion air supplied to the kiln. As an alternative to direct heat exchange, material has been cooled in the prior art by passing air through an indirect heat exchanger countercurrent to the flow of the material to be cooled. While this arrangement provides preheated secondary air for supporting combustion in the kiln, it does not cool the lime sufficiently rapidly.

I have invented a heat exchange system for a calciner which effectively and rapidly cools the lime while at the same time providing clean preheated air for combustion. My cooling system is more efficient than are cooling systems of the prior art.

One object of my invention is to provide a heat exchange system for a calciner which provides clean preheated combustion air.

A further object of my invention is to provide a heat exchange system for a calciner which is more efficient than are cooling systems of the prior art.

Other and further objects of my invention will appear from the following description.

In general my invention contemplates the provision of a heat exchange system for a calciner in which hot lime from a kiln passes sequentially through an indirect heat exchanger supplied with cooling air and then through a direct heat exchanger provided with an independent supply of cooling air. I supply heated air from the indirect exchanger to the kiln as combustion air. I pass the air from the direct heat exchanger through a dust collector to the exhaust.

In the accompanying drawings which form part of the instant specification and which are to be read in conjunction therewith and in which like reference numerals are used to indicate like parts in the various views:

FIGURE 1 is an exploded view of my heat exchange system for a calciner with parts removed.

FIGURE 2 is an elevation of the form of my heat exchange system shown in FIGURE 1.

FIGURE 3 is a fragmentary view illustrating the indirect heat exchanger of my heat exchange system with parts broken away and with other parts shown in section.

FIGURE 4 is a fragmentary view illustrating the direct heat exchanger of my heat exchange system for a calciner with parts broken away and with other parts shown in section.

FIGURE 5 is a fragmentary sectional view illustrating a detail of construction of the indirect heat exchanger of my heat exchange system for a calciner.

FIGURE 6 is a partially schematic view illustrating one form of air supply and exhaust system for my heat exchange system for a calciner.

FIGURE 7 is a diagrammatic view illustrating the flow of air in my heat exchange system for a calciner.

Referring now to the drawings, my heat exchanger for a calciner is supported on four uprights 10. A chute 12 conducts hot lime from a kiln (not shown) to the input chamber 14 of my heat exchange system. The lime from chamber 14 passes through an opening 16 and into chamber 18 located over the indirect heat exchanger indicated generally by the reference character 20 of my system. Heat exchanger 20 includes a plurality of air ducts 22 extending fore-and-aft of the apparatus as viewed in FIGURE 3, for example. I arrange the ducts 22 in a plurality of tiers with corresponding ducts of the various tiers in superposed relationship to provide a plurality of vertically extending passages 24 through which lime from the chamber 18 passes downwardly through the apparatus. In one arrangement for holding the ducts in assembled relationship, I provide a plurality of rods 26 extending from back to front of the apparatus between brackets 28 carried by uprights 30. Any suitable means, such as nuts 32, may be employed to hold the rods on the brackets 28. Each rod carries a plurality of spacers 34 which engage flanges 36 or the like secured to the ducts by any suitable means such as by welding to hold the ducts in assembled relationship.

An air inlet member 38 adjacent the lowermost tier of ducts 22 is supplied with cooling air through a transition member 40 in a manner to be described. The air supplied through inlet 38 passes into the interior of the ducts of the lowermost tier so as to travel from right to left as viewed in FIGURE 2. I provide a plurality of air transfer boxes 42 for connecting the ducts of a lower tier with the ducts of the next higher tier at corresponding ends thereof. For example, I connect the left ends of the ducts 22 of the lowermost tier as viewed in FIGURE 2 to the left ends of the ducts of the next uppermost tier as viewed in FIGURE 2. Another transfer box 44 connects to the right-hand ends of the ducts of the next lowermost tier to the right ends of the ducts of the tier next above the next to the lowest tier. I connect the ducts of the successive tiers from bottom to top in this manner until I arrive at the ducts of the uppermost tier. It will be seen that none of the air travelling through the ducts of the indirect heat exchanger is permitted to contact the lime travelling down the passages 24 through the heat exchanger. A plenum box 46 secured to the frame adjacent the right end of the uppermost tier of ducts 22 connects these ducts to a passage 48 formed at the top of the apparatus outside the top of the chamber 18.

After having traveled around the apparatus through the chamber 48, the heated air from the indirect heat exchanger passes to an outlet 50 from which the air may be supplied to the kiln as preheated combustion air. I dispose a baffle 52 in the uppermost part of the apparatus between the outlet 50 and the plenum box 46 to ensure that air from the box travels through the chamber 48 before going to the outlet 50.

I provide the apparatus with a plurality of inspection pipes 54 which normally carry caps 56. Pipes 54 lead into the chamber 18 to permit inspection thereof when the caps are removed.

From the structure thus far described, it will be apparent that hot lime from the chamber 18 passes downwardly along passages 24 between the ducts 22. In the course of this movement indirect heat exchange takes place between the air supplied through the inlet 38 and the lime. Owing to the relatively long passage for the cooling air appreciable cooling takes place.

After passing through the indirect heat exchanger 20, the lime enters the direct heat exchanger indicated generally by the reference character 58 of my apparatus. This direct heat exchanger 58 includes a chamber 60 having the shape of an inverted, slightly truncated pyramid with an outlet 62 through which the cool lime may pass to a suitable conveyor 64 or the like. I mount a baffle 66 shaped in the form of an erect pyramid within the chamber 60. Four ducts 68 extend through the walls of the chamber 60 and into the interior of baffle 66. I supply added cooling air to the ducts 68 so that the air flows into the interior of baffle 66 and out under the lower edge thereof and into direct heat exchange relationship with the lime. This air travels upwardly through the lime in the chamber 60 and then into a direct air plenum 70 surrounding the apparatus in the space between the chamber 60 and the lower end of the indirect heat exchanger 20. From the plenum 70 the direct heat exchange air passes to a duct 72. Preferably, I provide the opening 74 between the upper end of chamber 60 and the plenum 70 with a baffle 76 to prevent lime from entering the plenum.

Referring to FIGURE 6, I have illustrated one arrangement of an air system which I may employ for my heat exchange system. A motor 78 is adapted to be energized to drive a belt 80 which drives the input shaft 82 of a blower 84. A distribution box 86 transfers the air supplied by blower 84 to a duct 88 leading to the transition piece 40, from which the indirect air passes through the heat exchanger 20 and to the outlet 50. A second duct 90 supplied by blower 84 to the box 86 provides air to a manifold 92 having four spaced outlet ducts 94, 96, 98 and 100 connected to the respective ducts 68 leading to the interior of the baffle 66. As has been explained hereinabove, air supplied to the inside of baffle 66 travels up to the plenum 70 and from the plenum to the duct 72. I connect duct 72 to a dust collector 102 having an exhaust air outlet 104.

FIGURE 7 diagrammatically illustrates the relationship of my heat exchange system to a kiln 106 adapted to be supplied with preheated combustion air. Limestone fed to the kiln 106 through an inlet 108 is calcined and the resultant hot lime passes into the indirect heat exchanger 20 and the direct heat exchanger 58 in sequence to the outlet 62. Clean preheated air from the heat exchanger 20 is fed to the kiln 106. The dusty air from the direct exchanger 58 travels to the collector 102 in the manner described.

In operation of my heat exchange system for a calciner, hot lime from the kiln 106 is fed by chute 12 to the inlet chamber from whence it drops into the chamber 18 over the indirect heat exchanger 20. From the chamber 18 the hot lime travels downwardly through the passages 24 between the superposed ducts of the plurality of tiers of ducts 22. Cooling air supplied to the interior of the ducts 22 of the lowermost tier is directed by the transfer boxes successively to pass through the ducts of the various tiers from bottom to top of the apparatus. Not only is there provided a relatively long path for the flow of air but the duct construction offers a very large surface area of contact with the lime. Appreciable cooling of the lime takes place as it passes through the indirect heat exchanger 20. I take the air coming from the ducts 22 of the uppermost tier and pass it to the kiln 106 as preheated combustion air by means of the outlet 50.

After leaving the indirect exchanger, the lime travels downwardly toward the chamber 60 of the direct heat exchanger 58. Air supplied to the interior of baffle 66 travels around the lower edge of the baffle upwardly through the lime further cooling the lime by direct heat exchange. After passing through the lime in the chamber 60 the direct heat exchange air bearing the fines is collected by the plenum 70 and passes through the duct 72 to the dust collector 102. Relatively clean cool lime passes outwardly through the outlet 62 of the chamber 60 to the conveyor 64.

It will be seen that I have accomplished the objects of my invention. I have provided a heat exchanger for a calciner which effectively and rapidly cools lime while at the same time providing clean preheated combustion air for the kiln. My heat exchanger is more efficient than are heat exchangers of the prior art.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. Apparatus for cooling hot lime including in combination, an indirect heat exchanger comprising a plurality of tiers of generally horizontally extending ducts, means mounting the ducts of each tier in spaced vertically aligned relationship to form a plurality of generally vertical lime passages, transfer boxes for connecting the ducts of a lower tier to the ducts of the tier next above, means for supplying cooling fluid to the ducts of the lowermost tier, a direct heat exchanger comprising a chamber below said indirect heat exchanger for receiving lime from said passages, said chamber having an inlet and a discharge outlet below said inlet, said chamber having a wall constructed to provide a chamber configuration tapering from said inlet toward said outlet, a baffle disposed within said chamber between said inlet and said outlet, said baffle having a wall constructed to provide a configuration tapering from said outlet to said inlet, conduits extending through said chamber wall into the interior of said baffle, means for supplying cooling air to said conduits and a plenum chamber around said direct heat exchange chamber adjacent the top thereof.

2. Apparatus as in claim 1 including means for conducting heated air from the ducts of the uppermost tier to said kiln.

3. Apparatus as in claim 2 including a dust collector and means for conducting air from said plenum chamber to said collector.

4. Apparatus as in claim 1 in which said ducts are generally rectangular in cross-section, said ducts being arranged with the longer sides of said rectangular cross-section generally vertical.

5. Apparatus for use with a kiln for producing lime from limestone, including in combination, an indirect heat exchanger having an inlet for the admission of hot lime, a direct heat exchanger having an outlet for cool lime, means mounting said indirect heat exchanger and said direct heat exchanger in series to permit lime from said kiln to pass from said inlet to said outlet, means for supplying cooling air to said exchangers to cause said indirect heat exchanger to provide clean heated air and to cause said direct heat exchanger to provide other exhaust air and means for conducting said clean heated air to said kiln independently of said other exhaust air.

6. Apparatus as in claim 5 including a dust collector and means for conducting said other exhaust air from said direct heat exchanger to said collector.

7. Apparatus for use with a kiln for producing hot granular material including in combination first means for cooling said granular material by indirect heat exchange with cooling air to provide clean heated air, second means for cooling said granular material by direct heat exchange with other cooling air, means mounting said cooling means in series and means for conducting said clean heated air to said kiln independently of said other cooling air.

8. Apparatus as in claim 7 including a dust collector, and means for conducting said other cooling air from said second cooling means to said collector.

9. In a method of operating apparatus for producing lime the steps of first cooling said lime with first cooling fluid by indirect heat exchange to provide clean heated first cooling fluid, then cooling said lime with a second cooling fluid by direct heat exchange to provide other exhaust fluid, feeding said first cooling fluid to said kiln independently of said second cooling fluid and collecting dust from the second cooling fluid.

10. Apparatus for cooling lime from a kiln including in combination a chamber for receiving lime, said chamber having an inlet and a discharge outlet below said inlet, said chamber having a wall constructed to provide a chamber configuration tapering from said inlet toward said outlet, a baffle within said chamber between said inlet and said outlet, said baffle having a wall constructed to provide a configuration tapering from said outlet to said inlet, a conduit extending through said chamber wall and said baffle wall from outside said chamber to the interior of said baffle and means for supplying cooling air to said conduit.

11. Apparatus as in claim 10 in which said chamber and said baffle are of generally pyramidal configuration.

12. Apparatus as in claim 10 including a plenum chamber around said first named chamber and a baffle between said first named chamber and said plenum chamber.

13. Apparatus for cooling hot lime including in combination an indirect heat exchanger comprising a plurality of ducts, means mounting said ducts in spaced relationship to form a plurality of lime passages therebetween, a direct heat exchanger comprising a heat exchange chamber having an inlet below said ducts for receiving lime from said passages, said chamber having a discharge outlet below said inlet, said chamber having a wall constructed to provide a chamber configuration tapering from said inlet toward said outlet, a baffle within said chamber between said inlet and said outlet, said baffle having a wall constructed to provide a configuration tapering from said outlet to said inlet, means for passing cooling air through said ducts and means including a conduit extending through said chamber and baffle walls for supplying cooling air to said chamber.

14. Apparatus as in claim 13 in which said chamber and said baffle are of generally pyramidal configuration.

15. Apparatus as in claim 13 including a plenum chamber around said direct heat exchanger adjacent the top thereof.

16. Apparatus as in claim 15 including baffles between said direct heat exchange chamber and said plenum chamber.

References Cited

UNITED STATES PATENTS

| | | | |
|---|---|---|---|
| 1,833,666 | 11/1931 | Watson et al. | 165—166 |
| 1,903,650 | 4/1933 | Snow et al. | 165—145 X |
| 2,276,496 | 3/1942 | Kennedy | 34—170 |
| 2,911,198 | 11/1959 | Karlsson | 34—65 X |
| 2,960,323 | 11/1960 | Ludin | 263—29 |
| 3,176,969 | 4/1965 | Storm et al. | 263—29 |
| 3,274,701 | 9/1966 | Niemitz | 263—32 X |

FREDERICK L. MATTESON, JR., *Primary Examiner.*

R. A. DUA, *Assistant Examiner.*